US012785297B2

(12) United States Patent
Juillet et al.

(10) Patent No.: US 12,785,297 B2
(45) Date of Patent: Nov. 3, 2026

(54) RANGE TAKING SHEAR BOLTS AND DRIVE TOOLS

(71) Applicant: Richards Mfg. Co. Sales, LLC, Irvington, NJ (US)

(72) Inventors: Christopher Juillet, Warren, NJ (US); Jeffrey Madden, Bernardsville, NJ (US); Bruce Bier, Warren, NJ (US)

(73) Assignee: RICHARDS MFG. CO. SALES, LLC, Irvington, NJ (US)

( * ) Notice: Subject to any disclaimer, the term of this patent is extended or adjusted under 35 U.S.C. 154(b) by 600 days.

(21) Appl. No.: 18/479,322

(22) Filed: Oct. 2, 2023

(65) Prior Publication Data

US 2024/0026917 A1 Jan. 25, 2024

Related U.S. Application Data

(63) Continuation of application No. 17/658,373, filed on Apr. 7, 2022, now Pat. No. 11,773,891, which is a continuation of application No. 16/579,405, filed on Sep. 23, 2019, now Pat. No. 11,326,639.

(60) Provisional application No. 62/735,394, filed on Sep. 24, 2018.

(51) Int. Cl.

| | |
|---|---|
| ***H01R 4/30*** | (2006.01) |
| ***B25B 15/00*** | (2006.01) |
| ***F16B 31/02*** | (2006.01) |
| ***H01R 13/621*** | (2006.01) |

(52) U.S. Cl.

CPC ............ *H01R 4/30* (2013.01); *B25B 15/008* (2013.01); *F16B 31/021* (2013.01); *H01R 13/6215* (2013.01)

(58) Field of Classification Search

CPC ....... H01R 4/30; B25B 15/008; B25B 23/108; F16B 31/021

USPC .............................................................. 411/5

See application file for complete search history.

(56) References Cited

U.S. PATENT DOCUMENTS

| | | | | |
|---|---|---|---|---|
| 6,209,424 | B1 | 4/2001 | Croton | |
| 6,321,624 | B1 | 11/2001 | Croton | |
| 6,884,124 | B1 | 4/2005 | Luzzi | |
| 8,317,443 | B2 | 11/2012 | Stauch | |
| 8,668,419 | B2 | 3/2014 | Hardt | |
| 8,987,595 | B2 | 3/2015 | Bumgamer | |
| 9,929,477 | B2 | 3/2018 | Beiler | |
| 10,006,480 | B2 | 6/2018 | Bier | |
| 10,680,351 | B2 | 6/2020 | Parsons | |
| 10,756,452 | B2 | 8/2020 | Saeed | |
| 11,092,185 | B2 | 8/2021 | Peltier | |
| 11,326,609 | B2 | 5/2022 | Juillet | |
| 2018/0009089 | A1 | 1/2018 | Degenkolb | |
| 2018/0306231 | A1 | 10/2018 | Bier | |
| 2018/0354102 | A1 | 12/2018 | Kukucka | |
| 2019/0323538 | A1 | 10/2019 | Link | |
| 2020/0040930 | A1 | 2/2020 | Peltier | |
| 2022/0099131 | A1 | 3/2022 | Barezzani | |
| 2022/0316516 | A1* | 10/2022 | Juillet | B25B 23/0035 |

FOREIGN PATENT DOCUMENTS

| | | | |
|---|---|---|---|
| DE | 10234475 | A1 | 1/2004 |

* cited by examiner

*Primary Examiner* — Jason D Shanske

(57) ABSTRACT

Range taking shear bolts and bolt installation (drive) tools are described herein, which are configured for use with a variety of range taking connectors and conductors.

20 Claims, 9 Drawing Sheets

RANGE TAKING SHEAR BOLTS AND DRIVE TOOLS

CROSS-REFERENCE TO RELATED APPLICATIONS

This application is a continuation of U.S. application Ser. No. 17/658,373, filed on Apr. 7, 2022, now allowed, which is a continuation of U.S. application Ser. No. 16/579,405, filed Sep. 23, 2019, now allowed as U.S. Pat. No. 11,326,639, which claims the benefit of U.S. Provisional Application No. 62/735,394, filed Sep. 24, 2018, each of which is incorporated by reference herein in its entirety.

BACKGROUND

Electric power cables of all sizes are joined using connectors made from electrically-conductive material, usually metal. The predominant metals used are copper and aluminum. There are different types of connectors—some designed to be crimped, and some using bolts/screws to secure the conductors (cables/wires).

SUMMARY

Various embodiments of the present invention provide range taking shear bolts and bolt installation (drive) tools, which are configured for use with a variety of range taking connectors and conductor cables (or other articles being connected).

In some embodiments, the invention provides a range taking shear bolt, comprising: a hollow cylindrical body comprising a wall having an outer surface and an inner surface; a distal end constructed and arranged to abut a cable conductor; and a proximal end constructed and arranged to accept a drive tool, the outer surface having a substantially continuous screw thread thereon, and the inner surface having a plurality of spline teeth thereon, running longitudinally along a length thereof, wherein the wall is configured to shear within a predetermined shear zone when an applied torque reaches or exceeds a predetermined torque value.

In some embodiments, the predetermined torque value is a function of a thickness of the wall between the screw thread and the spline teeth.

In some embodiments, the bolt is formed from a metal or alloy.

In some embodiments, the inner surface of the cylindrical body further comprises a hexagonal impression proximate the distal end.

In some embodiments, the spline teeth run longitudinally from the proximal end to the distal end or, where present, the hexagonal impression.

In some embodiments, the spline teeth on the inner surface of the cylindrical body are symmetrical.

In some embodiments, the spline teeth on the inner surface of the cylindrical body are asymmetrical.

In some embodiments, the invention provides a range taking shear bolt kit, comprising: a range taking shear bolt; and a drive tool for installing the shear bolt in a range taking connector, the range taking shear bolt comprising: a hollow cylindrical body comprising a wall having an outer surface and an inner surface; a distal end constructed and arranged to abut a cable conductor; and a proximal end constructed and arranged to accept the drive tool, the outer surface having a substantially continuous screw thread thereon, and the inner surface having a plurality of spline teeth thereon, running longitudinally along a length thereof, wherein the wall configured to shear is within a predetermined shear zone when an applied torque reaches or exceeds a predetermined torque value; and the drive tool comprising: an inner portion configured to fit at least partially inside the cylindrical body of the shear bolt; and an outer portion configured to control a depth of tool insertion, the inner portion comprising a spline drive portion having a plurality of spline teeth running longitudinally on an outer surface thereof, the spline teeth on the outer surface of the spline drive portion constructed and arranged to mate with the spline teeth on the inner surface of the cylindrical body of the shear bolt.

In some embodiments, the invention provides a drive tool for a range taking shear bolt, comprising: an inner portion comprising a proximal head portion, a stem portion, a spline drive portion, and a distal end portion; and an outer portion comprising a tubular body, the distal end portion, the spline drive portion, and at least a portion of the stem portion configured to fit inside a hollow cylindrical body of the range taking shear bolt, the spline drive portion having a plurality of spline teeth running longitudinally on an outer surface thereof, the spline teeth on the outer surface of the spline drive portion constructed and arranged to mate with spline teeth on an inner surface of the cylindrical body of the shear bolt, and the tubular body configured to fit over the cylindrical body of the shear bolt, forming an external sleeve to control a depth of tool insertion.

In some embodiments, the head portion comprises a hexagonal head.

In some embodiments, the distal end portion has no spline teeth thereon.

In some embodiments, the inner portion and the outer portion are two separate pieces.

In some embodiments, a proximal end of the outer portion comprises an inwardly-facing flange configured to abut a lower surface of the head portion of the inner portion.

In some embodiments, the inner portion and the outer portion are formed as one piece.

Additional features and advantages of the present invention are described further below. This summary section is meant merely to illustrate certain features of the invention, and is not meant to limit the scope of the invention in any way. The failure to discuss a specific feature or embodiment of the invention, or the inclusion of one or more features in this summary section, should not be construed to limit the invention as claimed.

BRIEF DESCRIPTION OF THE DRAWINGS

The foregoing summary, as well as the following detailed description of certain embodiments, will be better understood when read in conjunction with the appended drawings, in which there are shown certain preferred embodiments. It should be understood, however, that the invention is not limited to the precise arrangements and instrumentalities shown. In the drawings.

DETAILED DESCRIPTION

In the case of bolted connections between a connector and an electrical cable, it is desirable to control the torque applied to the bolt, so that there is sufficient torque applied to create a secure connection (both electrically and mechanically), but not so much as to damage the conductor.

To accomplish torque control without using a torque wrench, a shear point or shear zone can be created, at or about where the driven portion of the bolt shears off (separates) from the clamping portion of the bolt at or approximate a predetermined torque value. The driven portion can then be discarded.

Separately, it is desirable to provide connectors that are “range taking”—meaning that a range of conductor sizes can be accommodated using the same connector.

Various embodiments of the present invention combine the features identified above, providing a range taking connector with the reliability of shear bolts.

For example, embodiments of the present invention provide range taking shear bolts that: break at a specific torque range; sufficiently clamp the conductors for both thermal cycling and mechanical pullout; break consistently (shear off) at or just below the outer surface of the connector; and/or are removable after shearing in the event that removal becomes necessary or desirable. Most products on the market have drawbacks related to one or more of these features.

Figure 1:
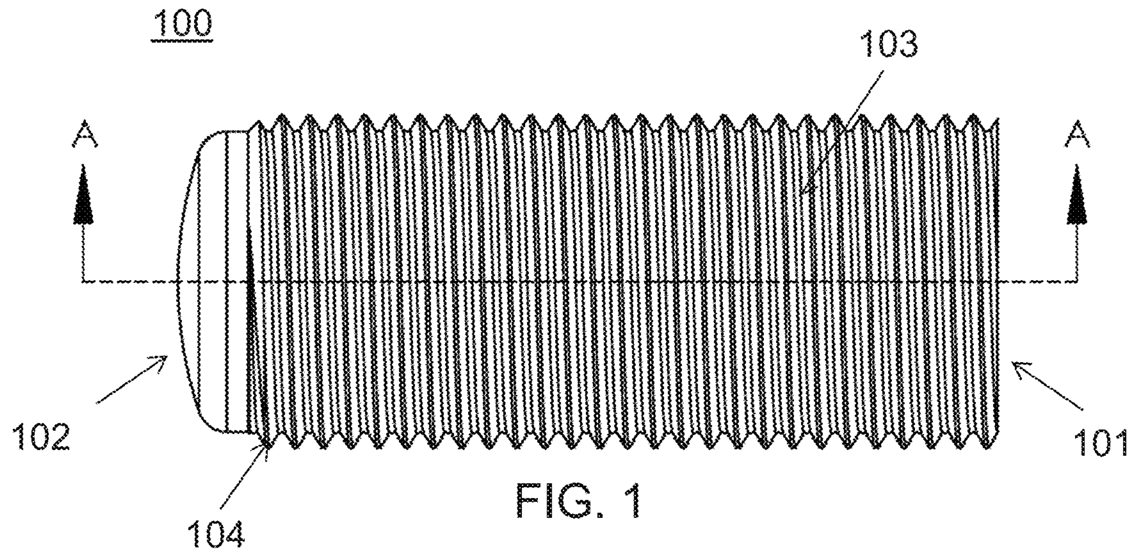
FIG. 1 is a side view of a range taking shear bolt according to some embodiments of the invention.
Figure 2:
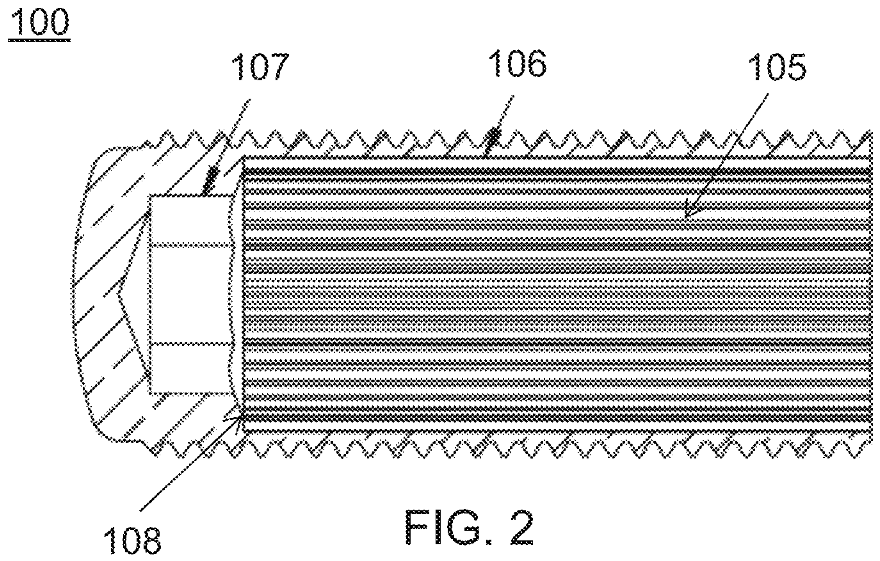
FIG. 2 is a sectional view, taken along line A-A of FIG. 1.
Figure 6:
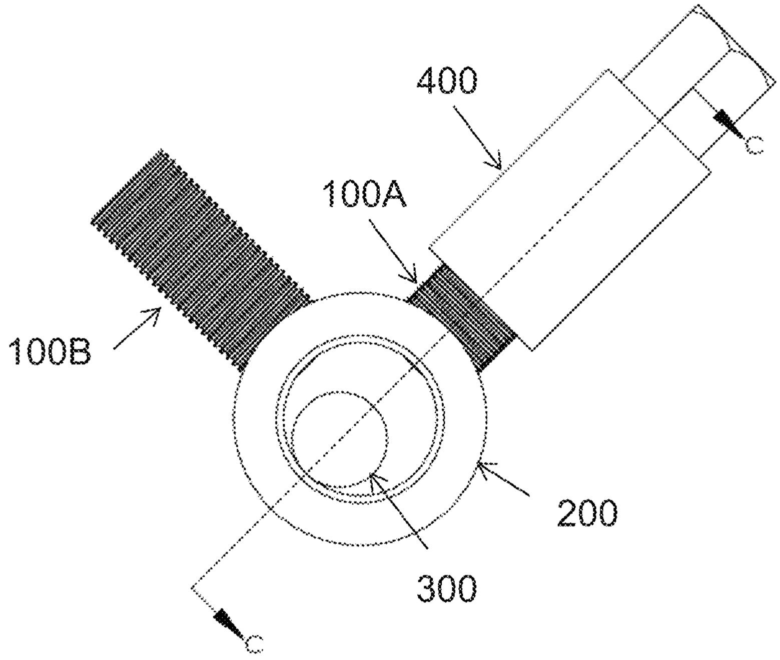
FIG. 6 shows the end view of FIG. 4 with a cable conductor and a bolt installation tool included.
Figure 9:
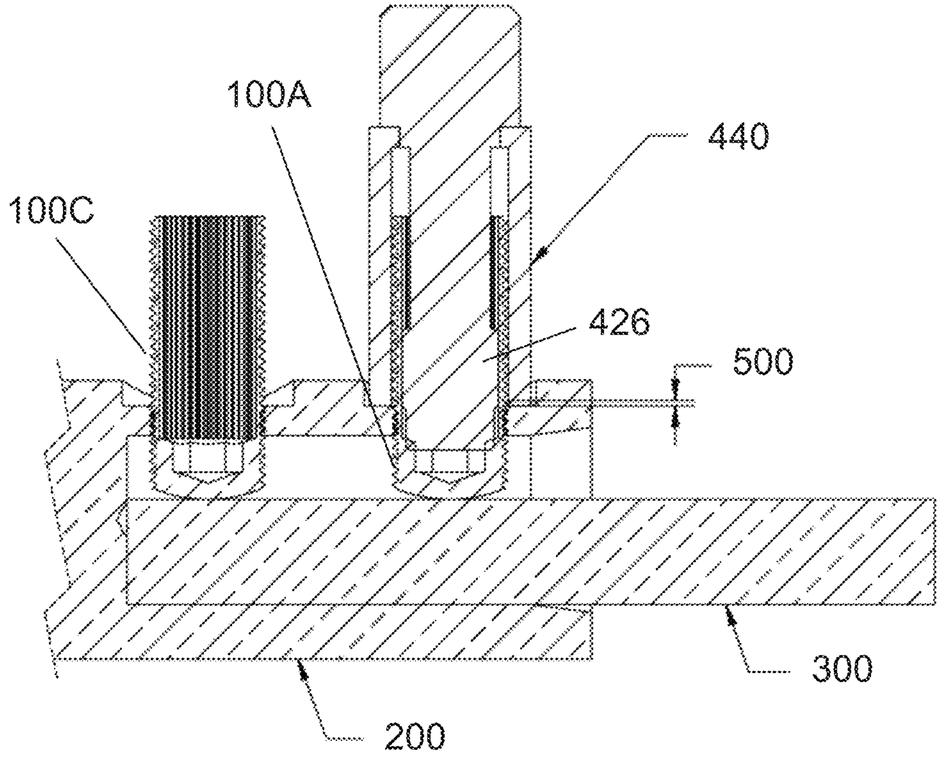
FIG. 9 is a sectional view, taken along line D-D of FIG. 8.

With reference to FIGS. 1 and 2, an illustrative range taking shear bolt 100 is shown. Range taking shear bolt 100 is substantially cylindrical, comprising a hollow cylindrical body having a proximal end 101, a distal end 102, an outer surface 103, and an inner surface 105. As described in further detail below, proximal end 101 is constructed and arranged to accept a bolt installation tool 400, also referred to herein as a drive tool (e.g., as shown in FIG. 6), and distal end 102 is constructed and arranged to abut a conductor 300 (e.g., as shown in FIG. 9). Proximal end 101 is preferably substantially or entirely open. Distal end 102 is preferably substantially or entirely closed. Outer surface 103 of range taking shear bolt 100 preferably has a screw thread 104 thereon. Screw thread 104 may comprise, for example, a substantially continuous external thread that allows range taking shear bolt 100 to be screwed into a connector 200. It should be understood that such thread 104 need not extend along the entire length of the bolt 100.

Figure 3A:
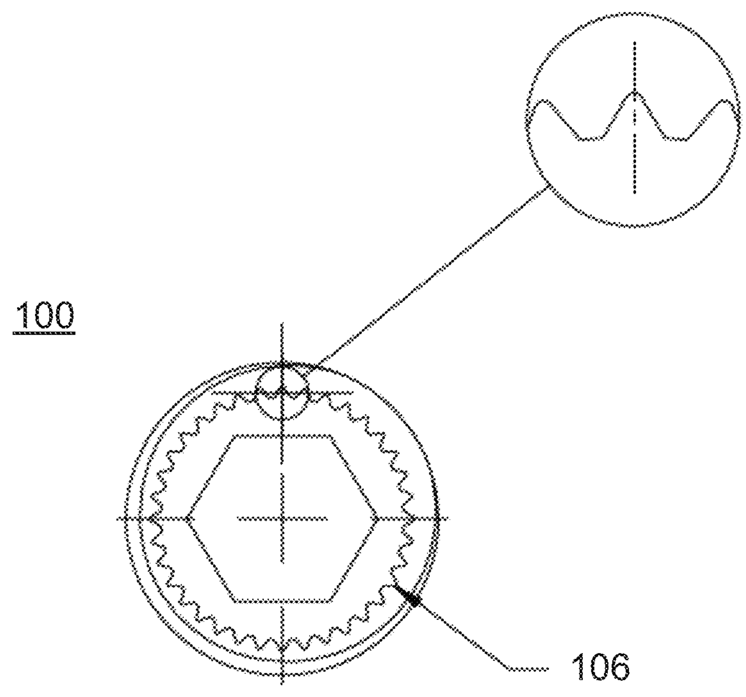
FIG. 3A is a top view of a range taking shear bolt of the present invention, showing spline teeth according to some embodiments.
Figure 3B:
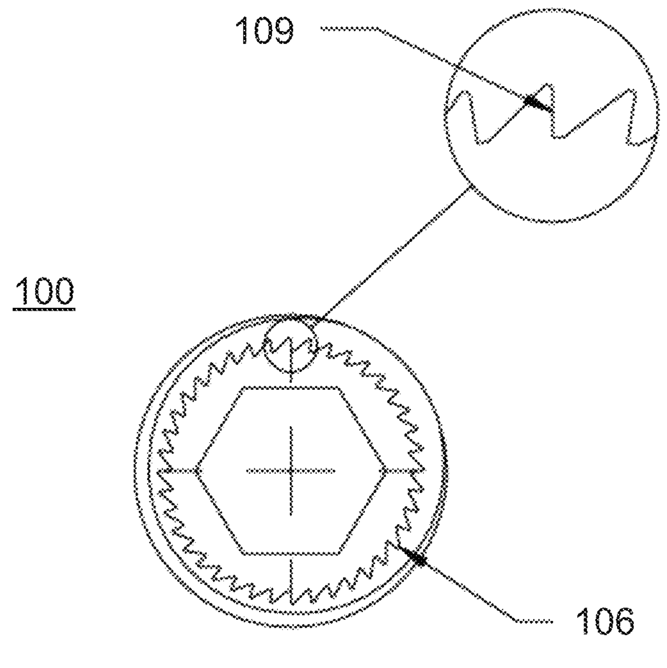
FIG. 3B is a top view of a range taking shear bolt of the present invention, showing spline teeth according to other embodiments.

Inner surface 105 of range taking shear bolt 100 has a plurality of spline teeth 106 (e.g., female spline teeth) thereon, which can function like gear teeth. Spline teeth 106 may comprise, for example, a plurality of raised ridges running longitudinally along the length of inner surface 105 (e.g., from a shoulder 108 near distal end 102 all the way to an open proximal end 101). In certain embodiments, spline teeth 106 may have a substantially triangular cross-section. In some embodiments, as shown, for example, in FIG. 3A, spline teeth 106 may be symmetrical. In other embodiments, as shown, for example, in FIG. 3B, spline teeth 106 may be asymmetrical, similar to a saw tooth, such that a line extending from the drive face 109 would go through (or in close proximity to) the center of the cylindrical body of bolt 100. In further embodiments, spline teeth 106 may have other shapes and/or arrangements that can complement and/or guide drive tool 400. For example, the spline teeth need not run the entire length of the inner surface 105.

The wall of cylindrical shear bolt 100 is configured to shear/break cleanly at or above a predetermined torque value (with an acceptable tolerance range). The predetermined torque value may be a function of the wall thickness between external thread 104 and internal teeth 106. The thickness may be determined, for example, based on the physical properties/metallurgy of bolt 100 (e.g., type of metal, hardness, elongation, etc.). Bolt 100 may be made from any material. In some embodiments, bolt 100 may be formed from a metal (e.g., copper, zinc, etc.) or alloy, such as, but not limited to, brass. In other embodiments, non-metal materials may be used.

In some embodiments, inner surface 105 may also include a hexagonal broach 107 proximate a closed distal end 102 (solid bottom portion) of bolt 100, bordering the distal end of longitudinal spline teeth 106 at shoulder 108. Hexagonal broach 107 comprises a hexagonal impression at the bottom of inner surface 105 of range taking shear bolt 100, which can facilitate removal of the clamping portion of bolt 100 once the driven portion (bolt head) has sheared off (see FIGS. 12-14). Around the hollow hexagonal impression 107, closed distal end 102 is solid. In alternative embodiments, other broaches or impressions may be used to facilitate removal.

Figure 4:
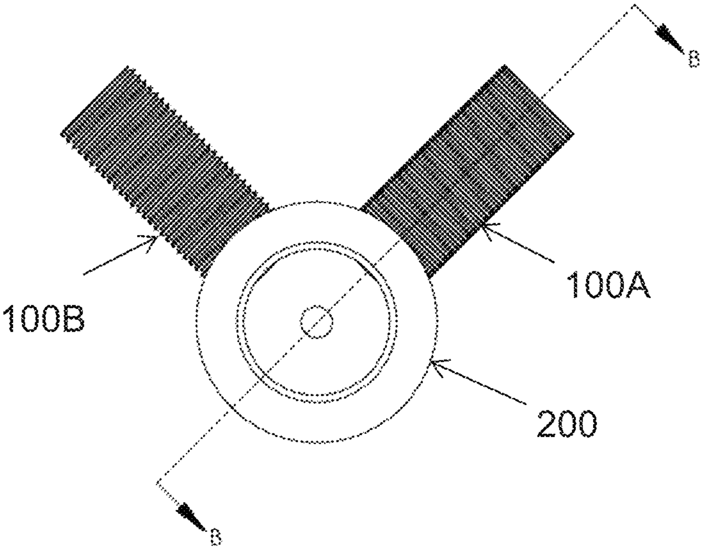
FIG. 4 is an end view of a connector with range taking shear bolts of the present invention partially installed therein.
Figure 5:
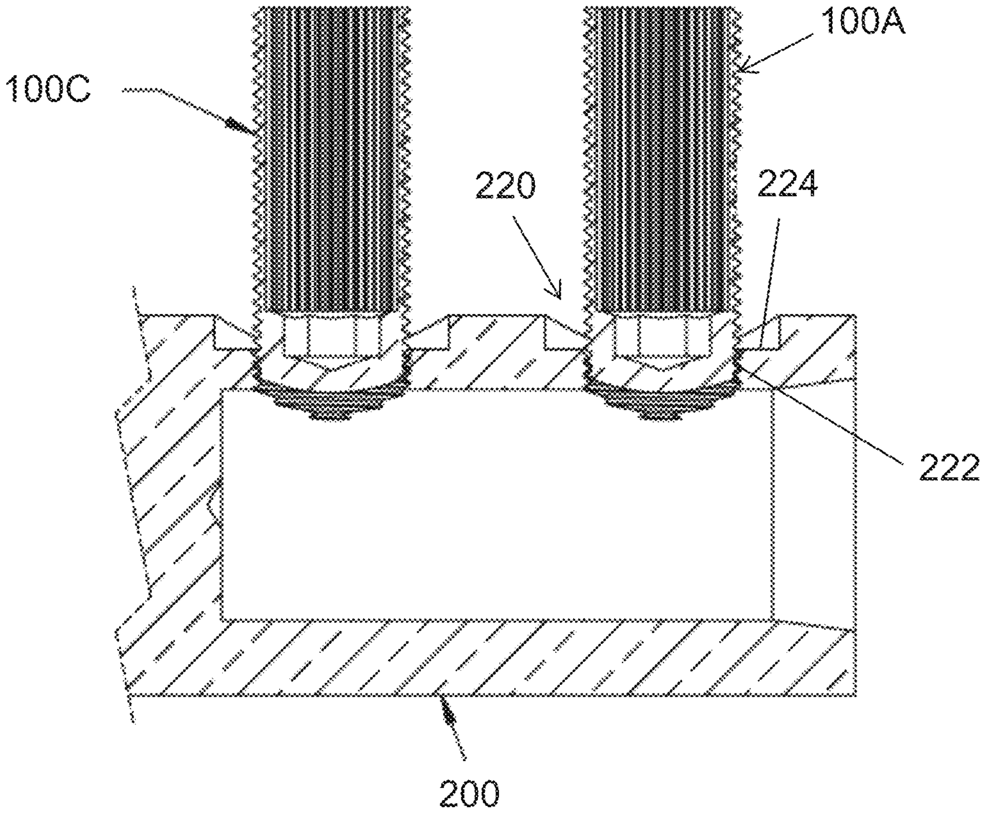
FIG. 5 is a sectional view, taken along line B-B of FIG. 4.

FIGS. 4 and 5 show range taking shear bolts 100 partially installed in/positioned to be screwed further into a range taking connector 200. The body of connector 200 may be substantially tubular, configured to accept cable, and may be made of any suitable material—for example, a machined metal, typically copper. A plurality of bolt installation sites 220 may be provided along the length of connector 200, which may be staggered, for example, by 90 degrees. FIGS. 4 and 5 show three set screws/bolts 100 (as used herein, the terms screw and bolt are interchangeable), two (100A and 100C) aligned as shown in the sectional view of FIG. 5 (one of which, 100A, is shown in FIG. 4), and a third (100B) offset by 90 degrees as shown in FIG. 4. Each bolt installation site 220 is configured to accept a range taking shear bolt 100 substantially perpendicular to the axis of the cable, and may comprise a threaded opening 222. In some embodiments, the outer diameter of connector body 200 may comprise a recessed portion/depression 224 at each bolt installation site 220. In other embodiments, the outer diameter of connector body 200 may comprise a substantially even surface.

Figure 7:
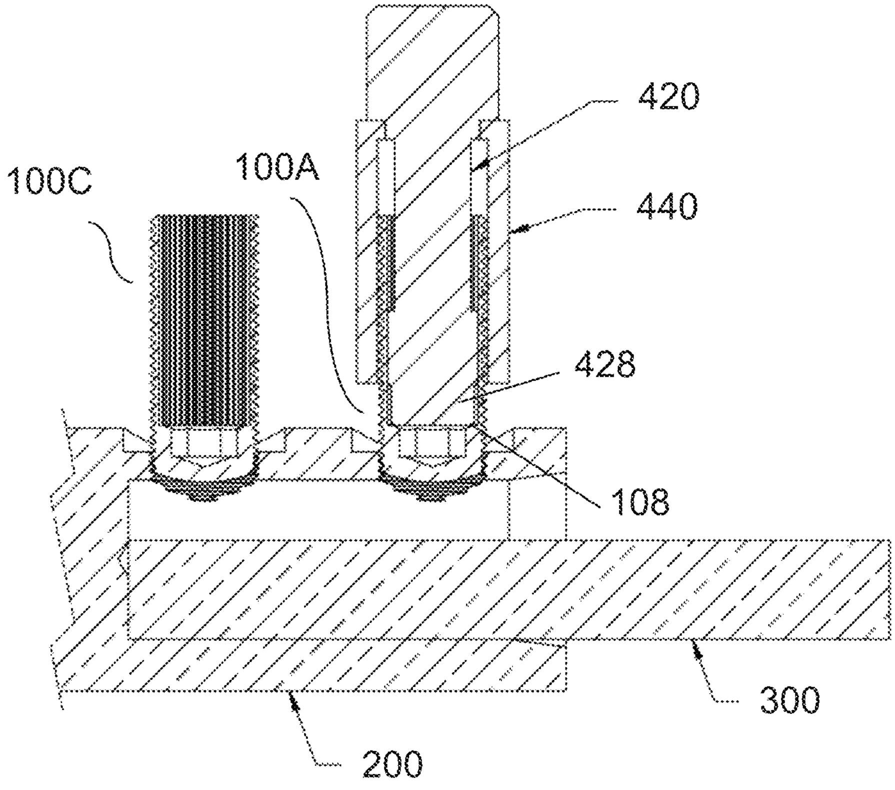
FIG. 7 is a sectional view, taken along line C-C of FIG. 6.

FIGS. 6 and 7 show range taking shear bolts 100A-C partially installed in connector 200 (as in FIGS. 4 and 5), with a cable conductor 300 and a bolt installation tool 400 also illustrated. As shown, for example, in FIG. 6, the body of connector 200 has an inner diameter larger than that of cable conductor 300, and thus can accommodate a range of conductor sizes. In certain embodiments, cable conductor 300 comprises a copper cable.

As shown, for example, in FIG. 7, in some embodiments, drive tool 400 comprises an inner drive portion 420 and an outer spacer portion 440. Inner portion 420 is configured to be positioned inside the hollow cylindrical body of bolt 100 and/or inside spacer portion 440, and comprises an inner drive tool with spline teeth to screw bolt 100 into connector 200. Outer portion 440 is configured to be positioned outside the hollow cylindrical body of bolt 100 and comprises an outer spacer tube to control shear zone 500 on bolt 100, as described further below. Outer portion 440 has an inner diameter that is approximately equal to or larger than an outer diameter of bolt 100, so that outer portion 440 of tool 400 can fit over and slide along the outer surface 103 of bolt 100. Inner portion 420 preferably has a distal end portion 428 (see also FIG. 11A) constructed and arranged to abut shoulder 108 on inner surface 105 of bolt 100, so that inner portion 420 of drive tool 400 does not engage the hexagonal impression 107 in bolt 100.

Figure 8:
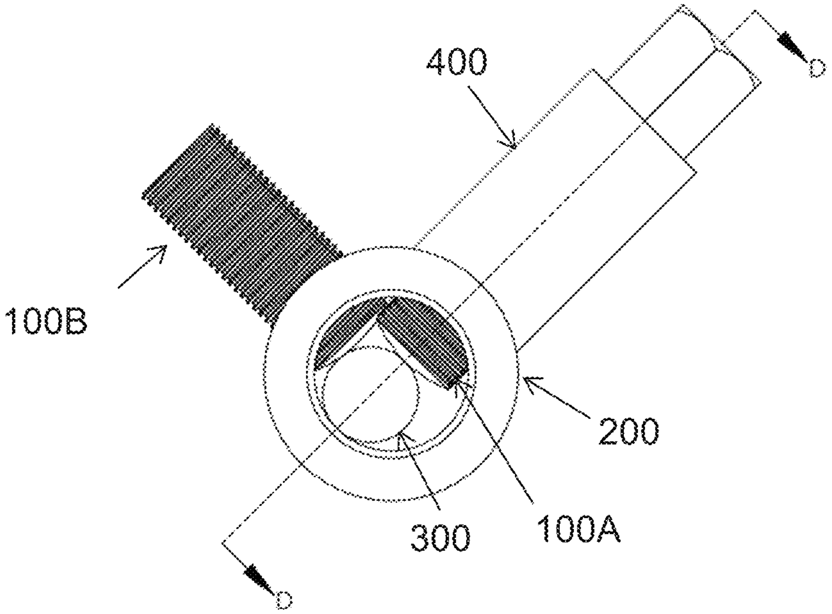
FIG. 8 shows the end view of FIG. 6 with the bolts tightened against the conductor.

FIGS. 8 and 9 show range taking shear bolts 100A-C (as in the views of FIGS. 6 and 7) installed in connector 200 and tightened against conductor 300. In some embodiments, outer tube 440 controls the depth of drive tool 400 to ensure that bolt 100 shears within a predetermined shear zone 500 at or about the outside surface of connector 200, or the bottom of depression 224 (socket) if present. Shear zone 500 occurs between the distal end of spline drive 426 (see also FIGS. 11A and 11B) and connector 200 shear surface—i.e., the outer diameter of connector body 200, or the bottom of depression 224 (socket) if present.

Figure 10:
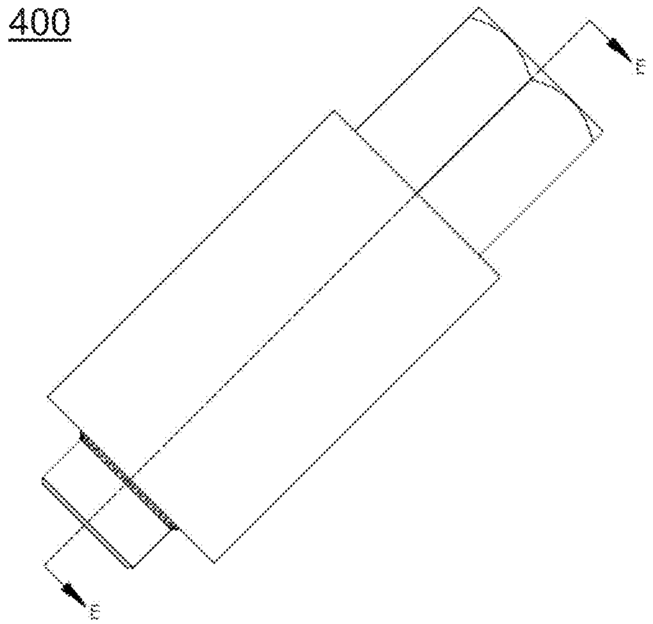
FIG. 10 is a side view of a bolt installation tool according to some embodiments of the invention.
Figure 11A:
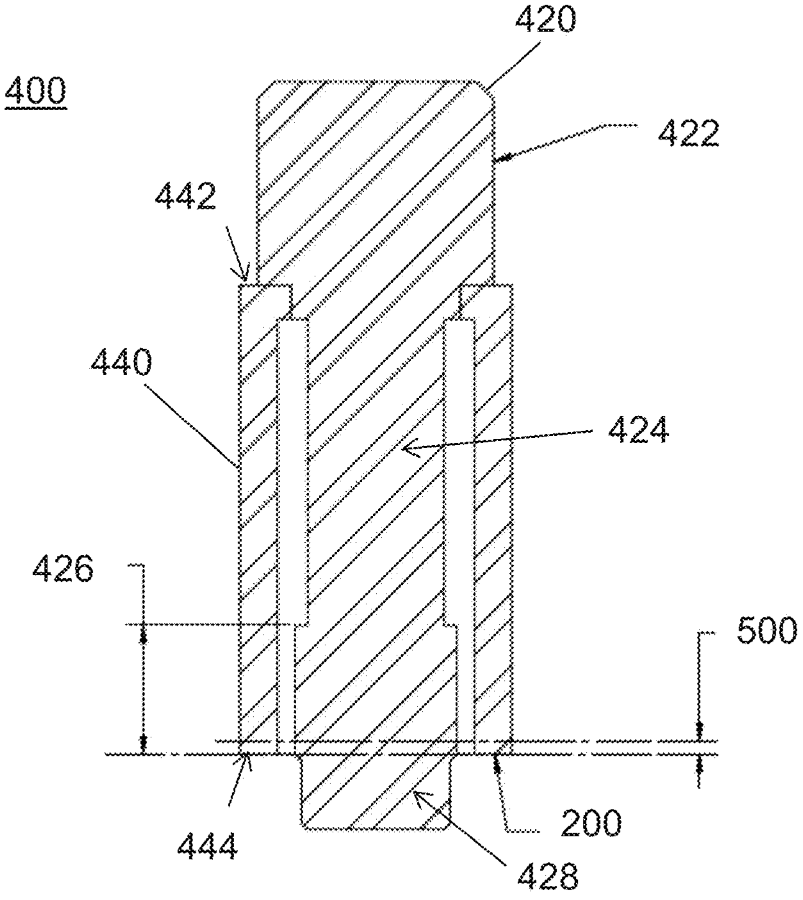
FIG. 11A is a sectional view, taken along line E-E of FIG. 10.
Figure 11B:
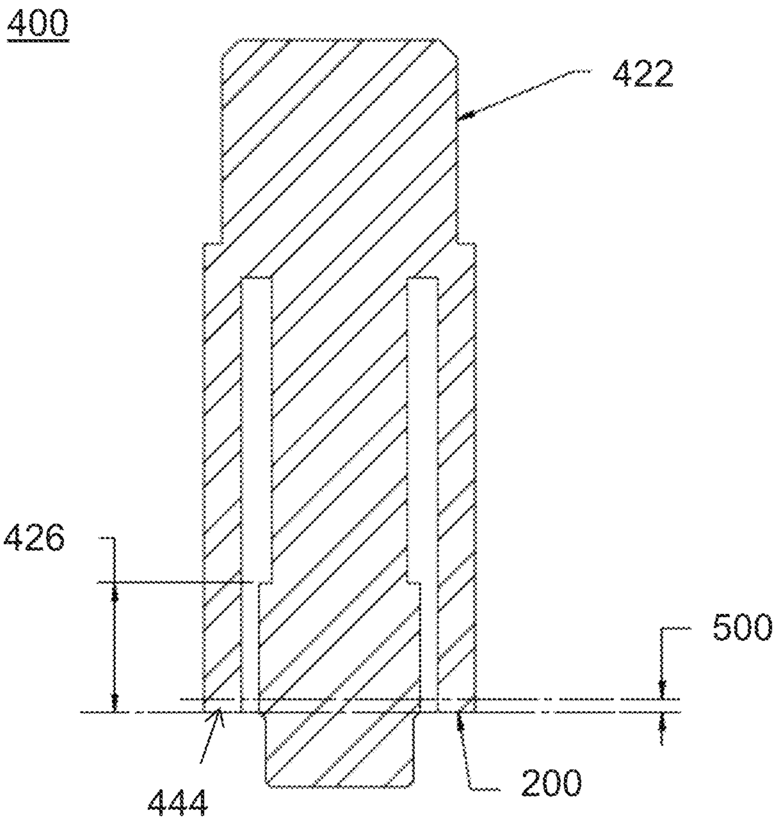
FIG. 11B is an alternative sectional view, taken along line E-E of FIG. 10.

FIGS. 10, 11A, and 11B show a bolt installation tool 400 in detail. In FIGS. 11A and 11B, a simulated outer diameter of connector body 200 is depicted. Range taking shear bolt 100 is configured to shear off at or near this surface—specifically, within bolt shear zone 500—regardless of its engagement depth into connector 200. In some embodiments, a head portion 422 of the drive tool 400, positioned at a proximal end of inner portion 420, can be hexagonal (a hex head), for example, to tighten drive tool 400 using a conventional socket wrench. A middle portion 424 of inner portion 420 can comprise an elongated stem, which has a diameter less than that of head 422, and less than the inner diameter of bolt 100. A spline drive portion 426 of inner portion 420 comprises longitudinal spline teeth (e.g., male spline teeth) complementary to spline teeth 106 on inner surface 105 of bolt 100. Spline teeth on spline drive portion 426 of drive tool 400 are constructed and arranged to engage with spline teeth 106 on inner surface 105 of bolt 100 to drive bolt 100 into connector 200 when drive tool 400 is rotated along its longitudinal axis. A distal end portion 428 of inner portion 420 of drive tool 400 can provide a short pilot diameter that has no spline teeth.

Thus, drive tool 400 can slide onto bolt 100 (as shown, e.g., in FIGS. 6-9) with inner drive tool portion 420 configured to slide along the inner surface 105 of bolt 100 and stop when distal end portion 428 abuts the shoulder 108 of bolt 100, and outer tube 440 configured to slide along the outer surface 103 of bolt 100 and stop when bottom edge 444 reaches the outer diameter of the connector body 200 (or the bottom of depression 224 at bolt site 220, if present). Drive tool 400 can be turned (e.g., via head 422), and screw thread 104 on outer surface 103 of bolt 100 can engage with threaded opening 222 on connector 200, to tighten bolt 100 against cable conductor 300 (as shown, e.g., in FIGS. 8, 9) until a predetermined torque value is reached and bolt 100 shears at shear zone 500 (as shown, e.g., in FIGS. 12-14).

In some embodiments, drive tool 400 may be provided in two pieces (420 and 440), as shown, for example, in FIGS. 7, 9, and 11A. Using a two piece drive tool, outer spacer tube 440 may, for example, be held in place against connector 200 while inner tool 420 is turned to screw bolt 100 into threaded opening 222, until the underside of head portion 422 abuts an upper shoulder 442 on tube 440 formed by a circumferential flange extending inward from the wall of tube 440. In other embodiments, drive tool 400 may comprise a single piece, as shown, for example, in FIG. 11B (inner and outer portions 420 and 440 either formed as one or fused together/fixed to one another by welding, adhesive, or other connective means), and the entire drive tool 400 may be turned to screw bolt 100 into connector 200 until a lower face 444 of the outer spacer tube portion abuts the outer diameter of connector body 200 (or the bottom of depression 224 at bolt site 220, if present).

Figure 12:
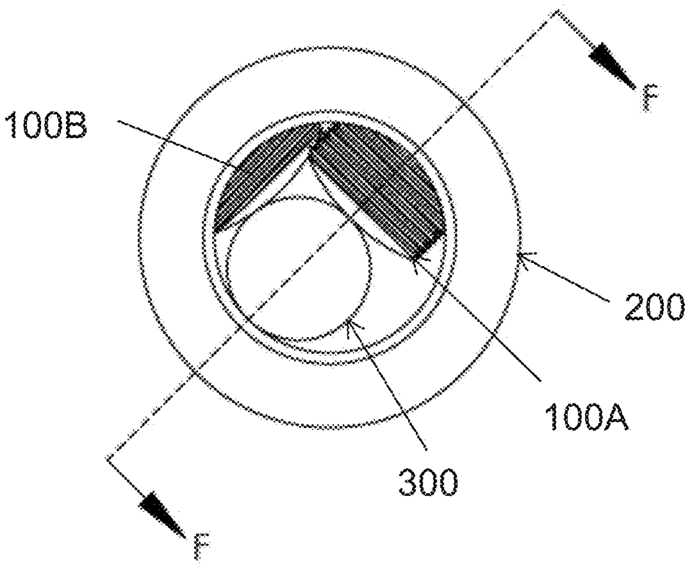
FIG. 12 shows the end view of FIG. 8 with the bolt heads sheared off and the bolt installation tool removed.
Figure 13:
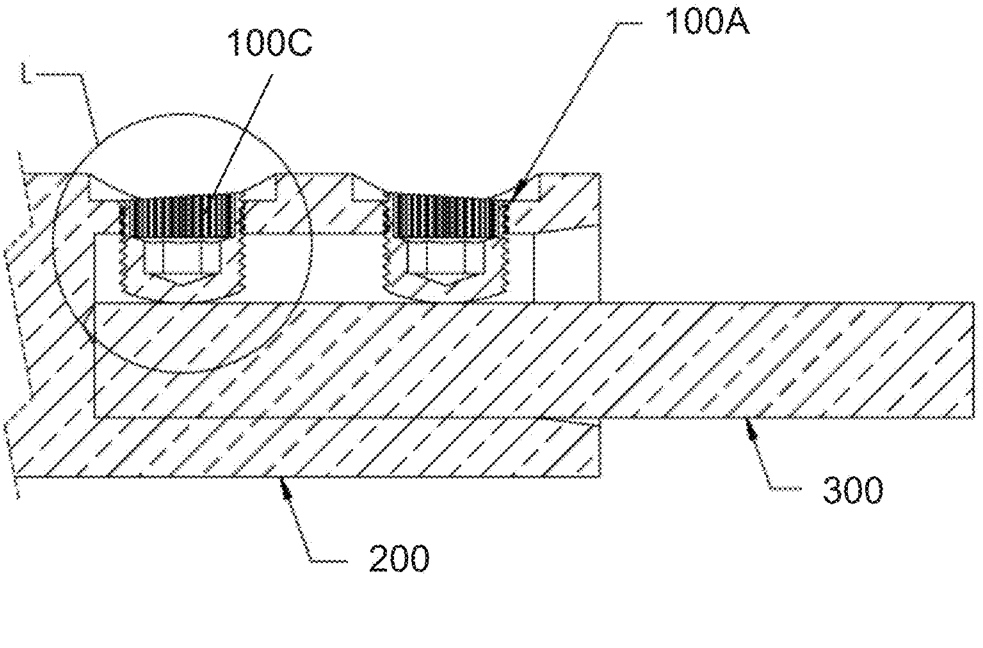
FIG. 13 is a sectional view, taken along line F-F of FIG. 12.
Figure 14:
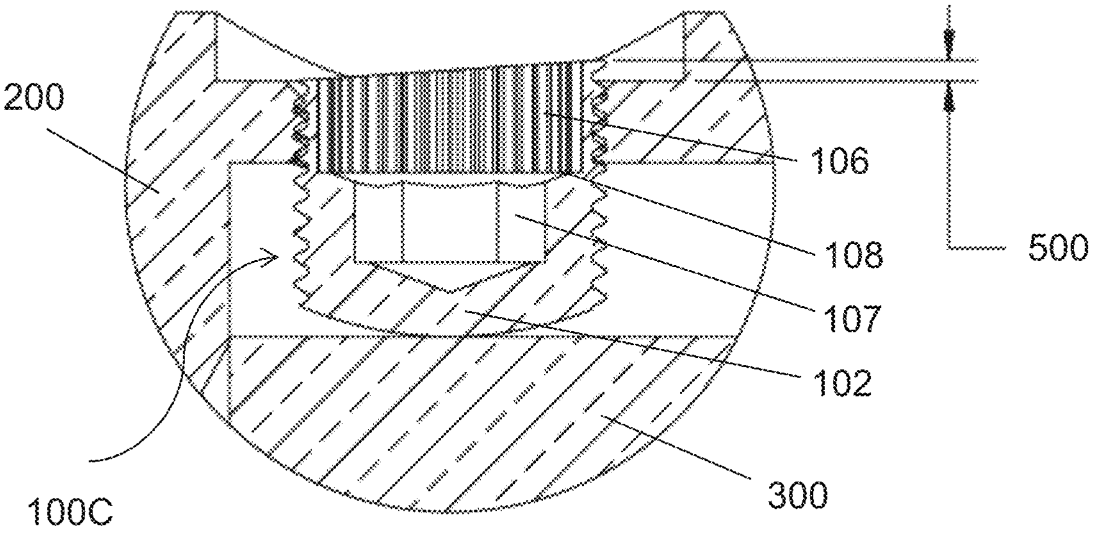
FIG. 14 shows detail L of FIG. 13.

FIGS. 12 and 13 show range taking shear bolts 100 (as in the views of FIGS. 8 and 9) fully installed in connector 200, with the bolt head (driven portion) sheared off. As shown, for example, in FIGS. 13 and 14, bolt 100 preferably shears at a point flush, within one revolution of thread 104, with the outer diameter of connector body 200 (or the bottom of depression 224 at bolt site 220, if present). Shear zone 500 is preferably approximately equal to one thread height of bolt 100, although in other embodiments different widths may be used. In the present embodiments, shear zone 500 will occur at the outer surface of connector 200, or the bottom of depression 224 if present, regardless of engagement depth.

While there have been shown and described fundamental novel features of the invention as applied to the preferred and exemplary embodiments thereof, it will be understood that omissions and substitutions and changes in the form and details of the disclosed invention may be made by those skilled in the art without departing from the spirit of the invention. Moreover, numerous modifications and changes may readily occur to those skilled in the art. Hence, it is not desired to limit the invention to the exact construction and operation shown and described and, accordingly, all suitable modification equivalents may be resorted to falling within the scope of the invention as claimed. It is the intention, therefore, to be limited only as indicated by the scope of the claims appended hereto.

What is claimed is:

1. A method of installing a range taking shear bolt in a connector body that includes a cable, the range taking shear bolt having a threaded outer surface and the connector body having an opening and a recessed region on an outer surface that surrounds the opening, the method comprising:

- aligning a distal end of the range taking shear bolt to be substantially perpendicular to an axis of a connector body;
- engaging the threaded outer surface of the range taking shear bolt with a threaded opening of the connector body;
- engaging the range taking shear bolt with a drive tool, the drive tool includes an outer portion that surrounds the outer threaded surface of the range taking shear bolt;
- applying torque to the range taking shear bolt with the drive tool to threadably engage the threaded outer surface with an internal threaded surface in the opening of the connector body until (1) the range taking shear bolt is tightened against the cable within the connector body and (2) the drive tool is positioned within the recessed region of the connector body; and in response to the torque exceeding a predetermined torque value and while the drive tool is positioned within the recessed region of the connector body, shearing the range taking shear bolt within a predetermined shear zone.

2. The method of claim 1 wherein the range taking shear bolt is formed from a metal or alloy.

3. The method of claim 1, wherein an inner surface of the range taking shear bolt includes a plurality of spline teeth, the spline teeth running longitudinally along a length of the inner surface.

4. The method of claim 3, wherein the predetermined torque value is a function of a thickness between the threaded outer surface and the plurality of spline teeth.

5. The method of claim 1, wherein the drive tool includes an inner portion, the inner portion having a proximal head portion, a drive portion, and a distal end portion.

6. The method of claim 5, wherein the drive portion is configured to mate with an inner surface of the range taking shear bolt.

7. The method of claim 5, wherein the drive portion of the inner portion of the drive tool has a non-round shape corresponding to a non-round shape of the inner surface of the range taking shear bolt.

8. The method of claim 5, wherein the proximal head portion includes a hexagonal region, the hexagonal region being on an outer surface of the proximal head portion.

9. The method of claim 5, wherein the inner portion of the drive tool further includes an elongated stem portion between the proximal head portion and the drive portion, a diameter of the elongated stem portion is less than a diameter of the proximal head portion of the drive tool.

10. The method of claim 1, wherein the predetermined torque value is a function of a thickness of the range taking shear bolt, the thickness being measured between the outer surface and an inner surface of the range taking shear bolt.

11. A method of installing a range taking shear bolt in a connector body that includes a cable by use of a drive tool, the range taking shear bolt having a threaded outer surface and the connector body having an opening and a recessed region on an outer surface that surrounds the opening, the drive tool having an inner portion and an outer portion, the inner portion of the drive tool having a proximal head portion, a drive portion located below the proximal head portion, and a distal end portion located below the drive portion, the method comprising:

aligning a distal end of the range taking shear bolt to be substantially perpendicular to an axis of a connector body;

engaging the threaded outer surface of the range taking shear bolt with a threaded opening of the connector body;

surrounding the outer threaded surface of the range taking shear bolt with the outer portion of the drive tool, an inwardly facing flange of the outer portion abutting the proximal head portion of the inner portion;

during the surrounding, inserting the distal end portion and the drive portion of the inner portion of the drive tool into a hollow region of the range taking shear bolt such that the drive portion non-rotationally mates with an inner surface of the range taking shear bolt, the drive portion having a non-round shape;

torquing the proximal head portion of inner portion of the drive tool until the range taking shear bolt is tightened against the cable within the connector body; and in response to the torque exceeding a predetermined torque value and while the outer portion of the drive tool is positioned within the recessed region of the connector body, shearing the range taking shear bolt within a predetermined shear zone.

12. The method claim 11, wherein the predetermined torque value is a function of a thickness between the threaded outer surface of the range taking shear bolt and a shear point of the inner surface of the range taking shear bolt.

13. The method of claim 11, wherein the outer portion of the drive tool and the inner portion of the drive tool are two separate pieces.

14. The method of claim 11, wherein a diameter of the distal end portion of the inner portion of the drive tool is less than a diameter of the drive portion, the distal end portion serving as a pilot for entry into the hollow region of the range taking shear bolt.

15. The method of claim 11, wherein the proximal head portion includes a hexagonal region.

16. The method of claim 15, wherein the hexagonal region is on an outer surface of the proximal head portion.

17. The method of claim 11, wherein the inserting the distal end portion and the drive portion includes inserting an elongated stem portion into the hollow region of the range taking shear bolt, the elongated stem portion being between the proximal head portion and the drive portion of the drive tool.

18. The method of claim 17, wherein a diameter of the elongated stem portion is less than a diameter of the proximal head portion of the drive tool.

19. The method of claim 11, wherein the torquing includes torquing the proximal head of the inner portion of the drive tool until the outer portion of the drive tool is positioned within the recessed region of the connector body.

20. The method of claim 19, wherein a lower face of the outer portion of the drive tool engages the recessed region of the connector body.

* * * * *